May 29, 1956    M. F. BRUNNER    2,747,946
PACKING RETAINER
Filed Jan. 22, 1953    2 Sheets-Sheet 1
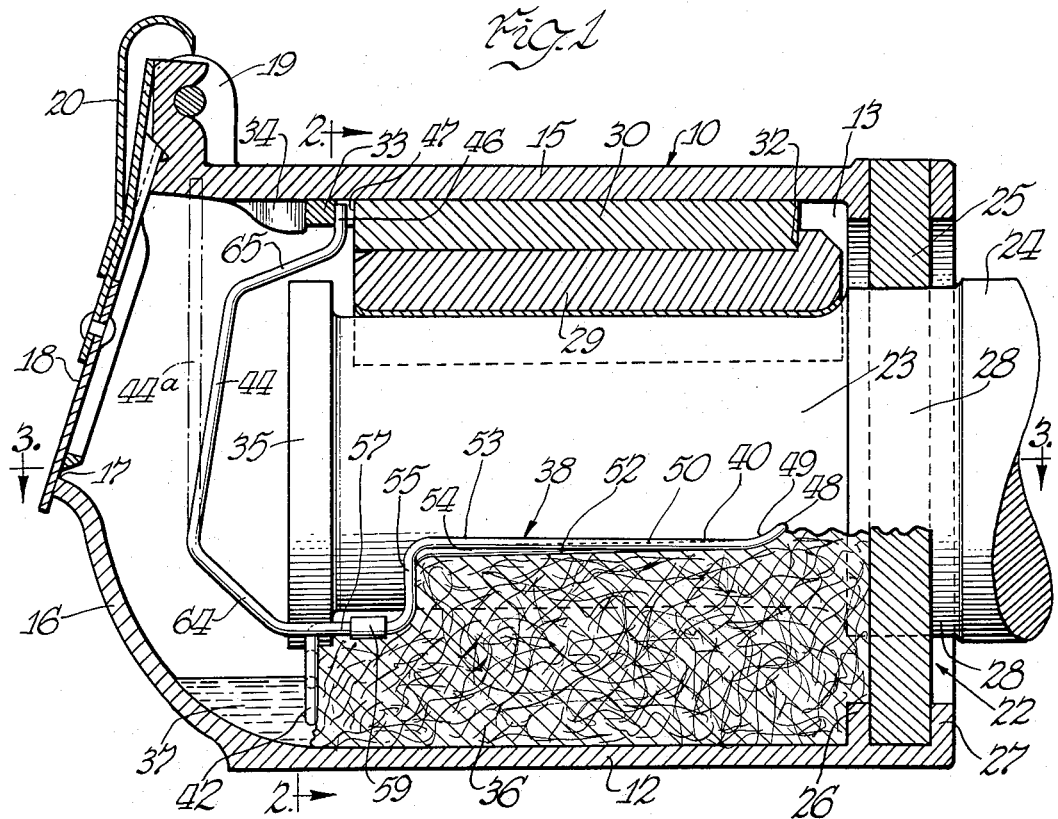
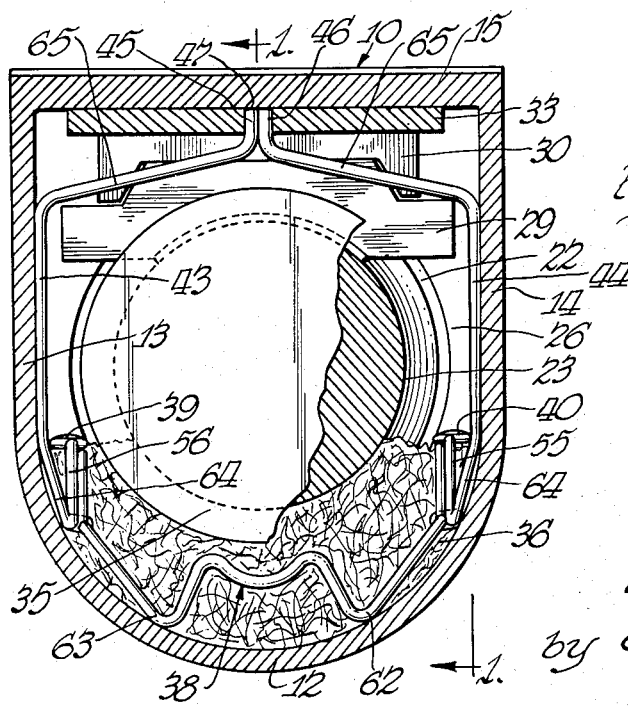
Inventor
Milton F. Brunner
by *H. Thrall Brewer*
Atty.

May 29, 1956 — M. F. BRUNNER — 2,747,946
PACKING RETAINER
Filed Jan. 22, 1953 — 2 Sheets-Sheet 2
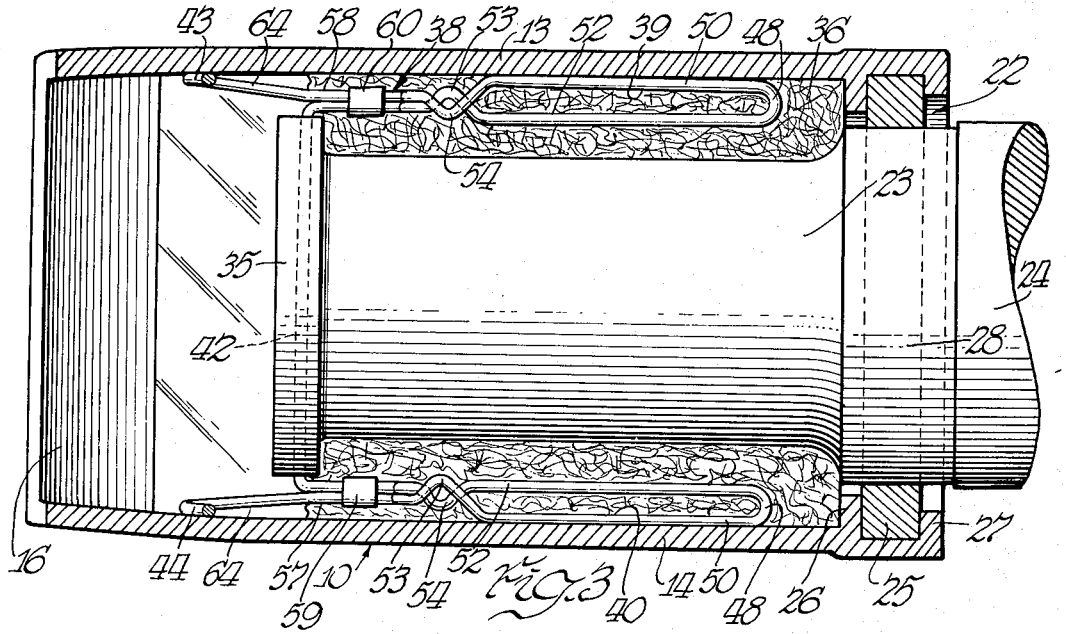
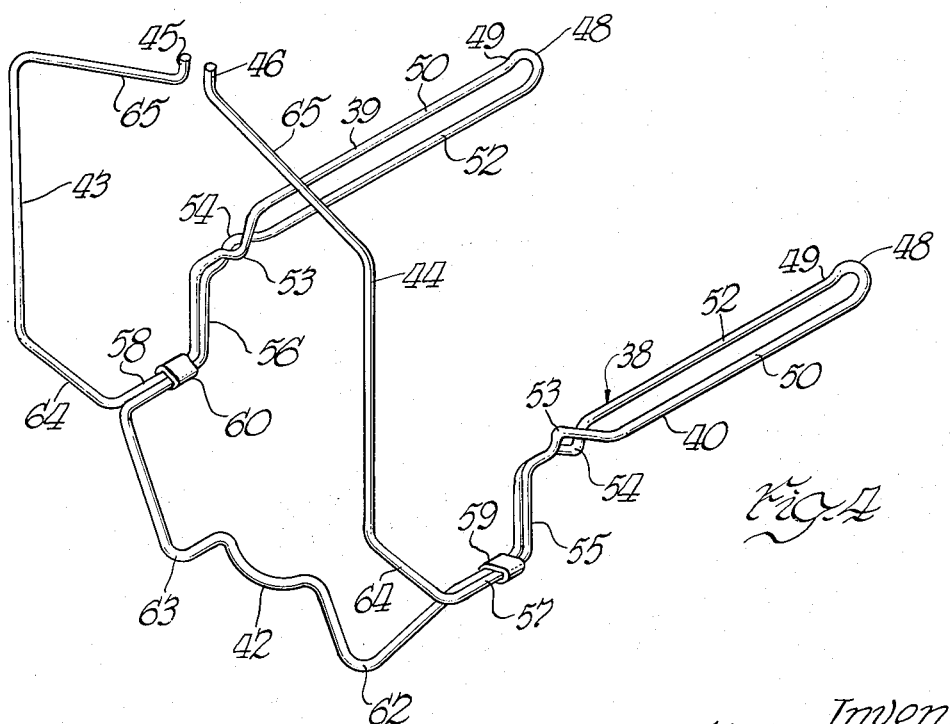
Inventor
Milton F. Brunner
by F. Thrall Brewer
Atty.

United States Patent Office 2,747,946
Patented May 29, 1956

---

2,747,946

PACKING RETAINER

Milton F. Brunner, Chicago, Ill., assignor to Spring Packing Corporation, Chicago, Ill., a corporation of Illinois Application January 22, 1953, Serial No. 332,644

1 Claim. (Cl. 308—89)

---

This invention relates to packing retainers, and more particularly to packing retainers of the type used in journal boxes on railway cars.

An object of my invention is to provide a packing retainer having side packing retaining arms, which, in addition to effectively retaining packing in its proper position relative to the lower portion of an axle journal, are offset downwardly at their outer ends to provide clearance from the journal collar which is sufficient to prevent damage to either the packing retainer or the journal collar, even when the axle is jolted from its normal bearing seat, as often happens during the "humping" or coupling of railway cars, or when slack is suddenly taken up in the couplings during ordinary operations of a car.

My invention has for another object the provision of a packing retainer having upright arms at its outer end which engage and have line contact with the side walls of the journal box to a height providing clearance of those arms from the journal collar when the car axle moves laterally and also to afford stability of the packing retainer within the journal box.

As another object, my invention has within its purview the provision of a packing retainer wherein the side packing retaining arms have retainer clips thereon and are offset to avoid contact of those clips with the walls of a journal box, thereby to prevent wear on the clips during use.

This invention further comprehends the provision of a packing retainer in which the configuration of the upright arms at the outer end of the retainer is such that those arms, when anchored to the wedge in a journal box, are not only stressed to hold the packing retainer securely in place, but also in a manner which avoids downward thrust on the outer end of the wedge.

The side packing retaining arms of the packing retainer of my present invention have outer side portions which are relatively straight so as to have line contact with the sides of a journal box, thereby to afford stability of the retainer within the journal box, and have portions bent to overlap, thereby to impart rigidity to the retainer substructure when installed.

Other objects and advantages of the invention will be apparent from the following description and the accompanying drawings, in which similar characters of reference indicate similar parts throughout the several views.

Referring to the two sheets of drawings:

Fig. 1 is a longitudinal section taken along a broken plane, substantially as indicated by lines 1—1 and accompanying arrows in Fig. 2, and provides a side view illustrating the adaptation of a preferred embodiment of my packing retainer to a journal box and bearing assembly of the type utilized on railway cars;

Fig. 2 is an end sectional view taken substantially on a line 2—2 of Fig. 1 and in the direction indicated by accompanying arrows, a portion of the structure being broken away to show certain details;

Fig. 3 is a top sectional view taken substantially on a line 3—3 of Fig. 1 and in the direction indicated by the arrows; and Fig. 4 is a perspective view of the packing retainer illustrated in Figs. 1, 2 and 3, with the parts thereof shown in their normal positions prior to placement in a journal box assembly.

In the accompanying illustration of my packing retainer, I have shown an illustrative embodiment of my invention, both as it appears prior to use and as it is associated with the parts of a journal box, axle and bearing assembly of a relatively standard type commonly used on railway freight and passenger cars. As depicted in Figs. 1, 2 and 3, a journal box 10 has a laterally curved bottom wall 12, side walls 13 and 14, and a top wall 15. The side and bottom walls are integrally adjoined by an outer end wall 16 through which an opening 17 is provided for access to the interior of the journal box; that opening 17 being normally closed by a cover 18 hingedly mounted for swinging movement relative to one or more lugs 19 at the top of the outer end of the top wall 15. A spring 20 is provided for normally holding the cover 18 in its closed position relative to the opening 17. At the inner end of the journal box, opposite the opening 17, an opening 22 is provided through which a journal 23 at one end of an axle 24 extends into the journal box. An oil seal 25 is mounted between internal flanges 26 and 27 adjacent the opening 22 and closely encompasses a cylindrical portion 28 of the axle.

Internally of the journal box 10, a bearing 29 is engaged by the journal 23 and is spaced from the top wall 15 of the journal box by a wedge 30. At its inner end, the wedge 30 engages an external shoulder 32 on the bearing, while an end portion 33 on the outer end of the wedge engages an internal lug 34 on the top wall 15 of the journal box to retain the wedge and bearing in place axially of the journal box. At the outer end of the journal 23, a collar 35 is provided in the form of an integral and radially projecting flange. The journal is somewhat longer than the bearing 29 to absorb side motion and to permit axial movement of the journal as the railway car moves over curved track, across switches and the like.

Below the journal and within the journal box, a quantity of waste 36 is provided which maintains contact with the journal and serves as a wick for carrying lubricant 37 from the lower portion of the journal box to the journal surface for lubrication of the journal 23 and bearing 29. My disclosed packing retainer 38 holds the waste or packing in place within the journal box and keeps it or particles thereof from getting between the journal and bearing.

As shown in Fig. 4, my disclosed packing retainer is made of a single piece of relatively resilient as well as relatively heavy, steel wire bent or formed to provide side packing retaining arms 39 and 40 in spaced and substantially parallel relationship to one another on opposite sides of the retainer below the axis of the journal, a connecting portion 42 which adjoins the outer ends of the side arms 39 and 40 and serves as a bottom support for the retainer, and upwardly projecting end portions 43 and 44 which extend upwardly from the outer ends of the side arms and are bent inwardly with integral hook portions 45 and 46 at their ends for engagement in an opening 47 in the wedge 30 to secure the retainer in place within a journal box, as shown in Figs. 1 and 2.

Considered in greater detail, the side packing retaining arms 39 and 40 of my packing retainer have return bends 48 at their inner ends and are desirably curved upwardly at 49 near those inner ends, to facilitate the installation of the packing retainer into a journal box and along the upper surfaces of the packing at the two sides of the journal. Extending outwardly from the return bent inner end portions 48, the side arms 39 and 40 each have relatively straight side portions 50 and 52 which are in spaced and substantially parallel relationship to one another. At the outer ends of the relatively straight side portions 50 and 52 of each of the side arms, the side portions are reversely bent at aligned positions, as indicated at 53 and 54, so that those reversely bent portions engage and overlap one another to afford added stiffness and rigidity to the side arm structures.

Outwardly of the reversely bent and overlapping portions 53 and 54 of the side arms 39 and 40, those side arms are offset downwardly, the downward offset being provided by downwardly extending portions 55 and 56 of the side arms 39 and 40 and continued outward extensions 57 and 58. At the downwardly extending portions 55 and 56 and the outwardly extending portions 57 and 58, the side portions afforded by the two wire sections are in adjacent and engaging relationship, and are held in such relationship by metal clips 59 and 60 extending around the portions 57 and 58. One of the wires of each of the side arm portions extends downwardly and laterally from the outwardly projecting portions 57 and 58 to provide the integral connecting portion 42. In the disclosed embodiment, opposite sides of the connecting portion 42 embody substantially V-shaped bends 62 and 63 which serve as supporting lugs for the packing retainer when it is installed in a journal box, as depicted in Fig. 2.

The other wire portions of each of the side arms 39 and 40 have portions 64 extending upwardly and outwardly from the outer ends of the outwardly projecting portions 57 and 58 in obtuse angular relationship thereto. From the portions 64, the substantially straight end portions 43 and 44 extend upwardly in substantially parallel relationship to one another and then have portions 65 extending inwardly toward one another, with the hook portions 45 and 46 at their adjacent ends. Normally, and as depicted in Fig. 4, the upwardly projecting end portions 43 and 44 and their inwardly projecting ends 65 occupy a general plane which is disposed in substantially right-angular relationship to the general plane of the side arms 39 and 40. In the installation of the packing retainer, however, and as illustrated in Fig. 1, the upwardly projecting ends 43 and 44 are each stressed torsionally when the inwardly projecting portions 65 are forced into positions such that the hook portions 45 and 46 are engaged in the opening 47 in the end portion 33 of the wedge 30. It may be observed that such torsionally stressed end portions 43 and 44, in the form disclosed, do not have any appreciable downward thrust which is applied to the outward end of the wedge and might have a tendency to effect disengagement of the end portion 33 of the wedge from the lug 34.

It may be observed by reference to Figs. 3 and 4 that by having the outer side portions 50 of the side arms relatively straight, an elongated contact is maintained between those side portions and the inner surfaces of the side walls of the journal box, thereby to stabilize the packing retainer laterally of the journal box. As previously mentioned, the overlapping and reversely bent portions of the side arms tend to rigidify those side arms at their juncture with the downwardly extending and offset portions of the side arms. The retaining clips 59 and 60 further tend to afford rigidity to the side arm structures.

As a further element and feature of my disclosed side arm structures, it may be observed by reference to Fig. 3 that the downwardly offset portions of the side arms, outwardly of the reversely bent and overlapping portions 53 and 54, are offset inwardly in a lateral direction from the outer side arm portions 50, so that the clips 59 and 60 are normally held away from the inner surfaces of the journal box side walls. This prevents wearing of the clips as a result of frictional engagement with the journal box side walls during use, and is desirable because the metal of which the clips 59 and 60 are made is generally softer than that of the wire from which the packing retainer is formed.

Referring to Figs. 1 and 2 in particular, it may be observed that the various elements of configuration of my disclosed packing retainer afford ample clearance of all parts of the packing retainer from the radially projecting collar 35 at the end of the journal 23. For example, the downwardly extending portions 55 and 56 of the side arms are amply spaced inwardly of the collar 35 in a direction axial to the journal 23, while the upwardly projecting ends 43 and 44 are spaced outwardly of that collar in a direction axial to the journal. Intermediate the downwardly projecting portions 55 and 56 of the side arms and the upwardly projecting ends 43 and 44, the side arms are offset downwardly to an extent such that they cannot be engaged by the periphery of the collar 35, even when the journal is jolted to an extent that it leaves the normal position of contact with the bearing 29, as often occurs in "humping" or coupling the railway cars, or when slack is taken up in the couplers between cars in operation. Preventing the possibility of engagement between the journal collar 35 and any part of the packing retainer is a definite safety factor which avoids damage to either the packing retainer or the journal collar during use, and also greatly prolongs the useful life of my packing retainers.

Although the portions of the side arms at the clips 59 and 60 are offset inwardly in a lateral direction, the portions 64 of the upwardly projecting ends 43 and 44 extend outwardly in a lateral direction, as shown in Figs. 2 and 3, whereby the relatively long and upwardly projecting ends engage the inner side wall surfaces of the journal box along substantial portions of their lengths, so as to afford another element of lateral stability to my packing retainer when it is installed in a journal box. The inwardly extending upper end portion 65 of the upwardly projecting ends further tends to brace and stabilize the packing retainer laterally by tending to retain the contact between those upwardly extending end portions and the inner surfaces of the journal box side walls. In addition, the torsional flexure and angular flexure of the upwardly extending ends, as indicated by the normal position at 44a in Fig. 1 and the installed position shown in solid lines, exerts a force tending firmly to hold the inner ends of the packing retaining side arms firmly and tightly in contact with the upper side surfaces of the packing.

As shown in Fig. 2, another element of clearance is provided for in my disclosed packing retainer structure in that the parts are shaped to avoid contact of the collar 35 with any portion of the packing retainer as a result of excessive side thrust which moves the journal axially relative to the bearing. The upwardly extending ends 43 and 44 extend to positions above the limits of the collar 35 before being bent inwardly to provide the inwardly projecting portions 65. Furthermore, the flexure of the upwardly extending and inwardly extending portions 43, 44 and 65 of my disclosed packing retainer which is required for effecting the installation and retention of the retainer in its operating position within a journal box does not defeat the clearances from the collar 35 which are provided for by the factors of configuration incorporated in the retainer.

From the foregoing description and reference to the accompanying drawings, it may be readily understood that my disclosed packing retainer embodies many advantageous features, in that the various parts have substantial areas of engagement with the internal surfaces of the journal box to hold and stabilize the retainer in its operating position, wear is prevented from occurring on the softer clips utilized in such structures, ample clearances are provided for preventing contact of the journal collar with any part of the packing retainer under either normal or abnormal conditions of operation, and the retainer is firmly secured in place within the journal box without exerting forces upon the wedge which might have a tendency to dislodge it from its operative position.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

In a railway car journal box having top and side walls and a rounded bottom with a car wheel axle journal in said box and a bearing engaging said journal with a wedge disposed between said bearing and the top wall of the box, said wedge having an opening at its outer end and said journal having a radially projecting collar at its outer end normally spaced from the adjacent end of the journal box, a packing waste retainer formed from a single length of relatively heavy resilient wire and comprising a pair of packing retainer side arms with one of said side arms being spaced laterally from and parallel to each side of said axle journal and with each of said arms being disposed lower than the axis of the axle journal, said side arms each including an elongated loop of said wire with the outer strand of each loop engaging the journal box side walls and an inner strand of each loop parallel to the respective outer strands, said loops having at their axially inward ends portions slightly upwardly bent an amount sufficient to avoid snagging packing waste in the journal box when the retainer is installed in its operative position and said loops having at their axially outward ends reversely bent stiffening and overlapping portions which are adapted to engage one another, each of said side arms having a downwardly offset portion which includes two strands of said wire connected to the respective inner and outer strands of said loops axially outwardly of said reversely bent portions, said downwardly offset portions providing clearance from the axle journal collar upon any possible position of the latter and including engaging parts spaced inwardly from the adjacent walls of said journal box; a connecting section extending between and connected to axially outward ends of respective strands of said downwardly offset portions of the side arms, said connecting section having portions engaging the bottom of said journal box; a pair of clips connecting the downwardly offset portions of said side arms for holding the strands of each arm together with said reversely bent portions in engagement to rigidify the side arms, said clips being connected to said engaging parts of the downwardly offset portions whereby the clips are spaced from the walls of said journal box; and elongated end sections connected to the respective downwardly offset portions of said side arms and extending upwardly and axially outwardly therefrom, said end sections including portions engaging the side walls of said journal box for substantially the full height of the walls and then extending axially inwardly toward one another at a point above any possible position of said collar on the journal, the terminating ends of said end sections engaging in the opening in said wedge to position and secure said retainer in the journal box.

References Cited in the file of this patent

UNITED STATES PATENTS

| | | |
|---|---|---|
| 2,371,247 | McMullen | Mar. 13, 1945 |
| 2,460,031 | Ripley | Jan. 25, 1949 |
| 2,461,287 | Lagreid et al. | Feb. 8, 1949 |
| 2,631,903 | Morris | Mar. 17, 1953 |